July 18, 1933.  C. RORABECK  1,918,564
STEERING CONSTRUCTION FOR TRACTOR UNITS
Filed May 7, 1931  4 Sheets-Sheet 1

Witness
R. B. Davison.

Inventor
Claude Rorabeck
By
Attys

July 18, 1933.  C. RORABECK  1,918,564
STEERING CONSTRUCTION FOR TRACTOR UNITS
Filed May 7, 1931  4 Sheets-Sheet 2
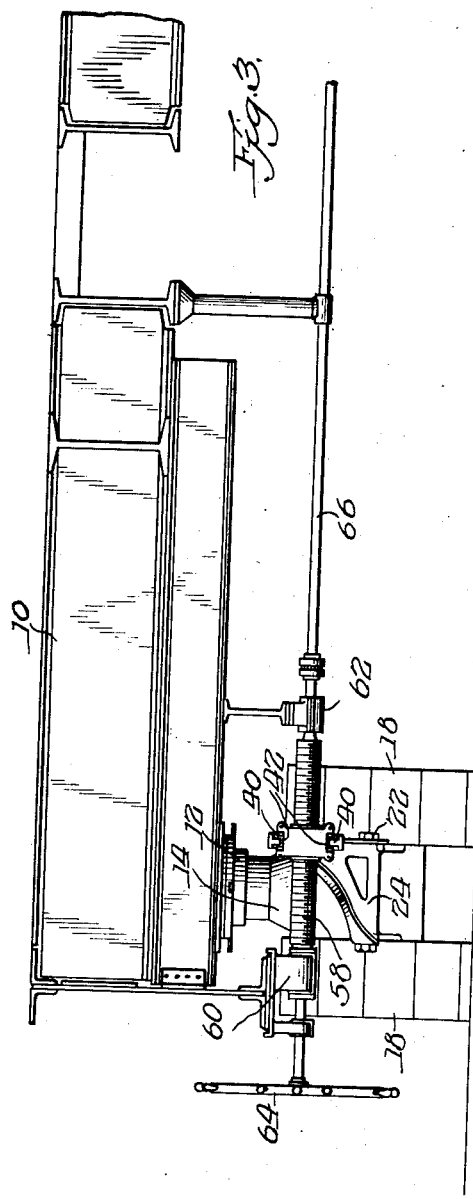
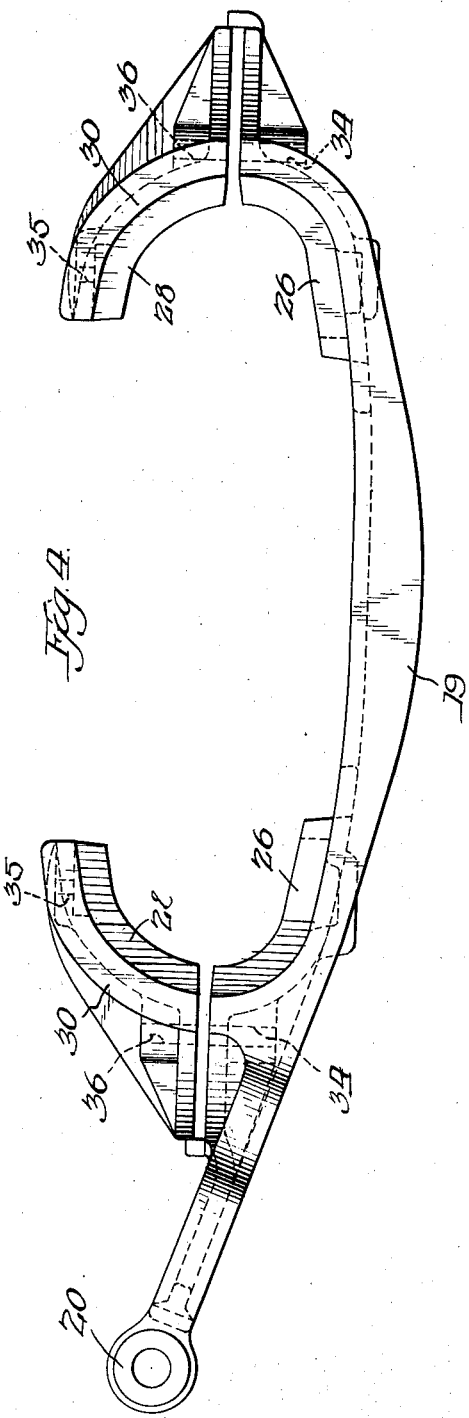
Inventor:
Claude Rorabeck

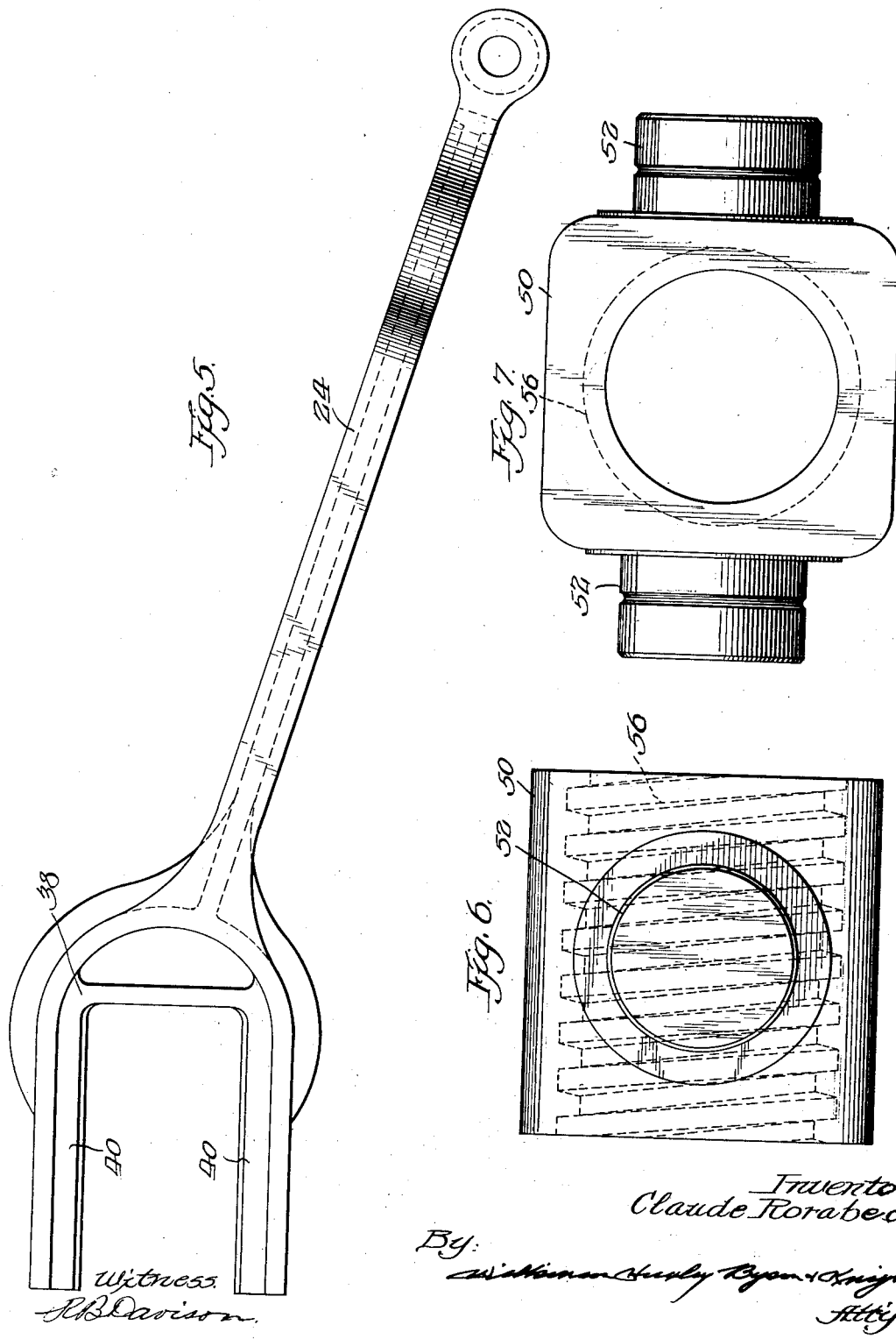

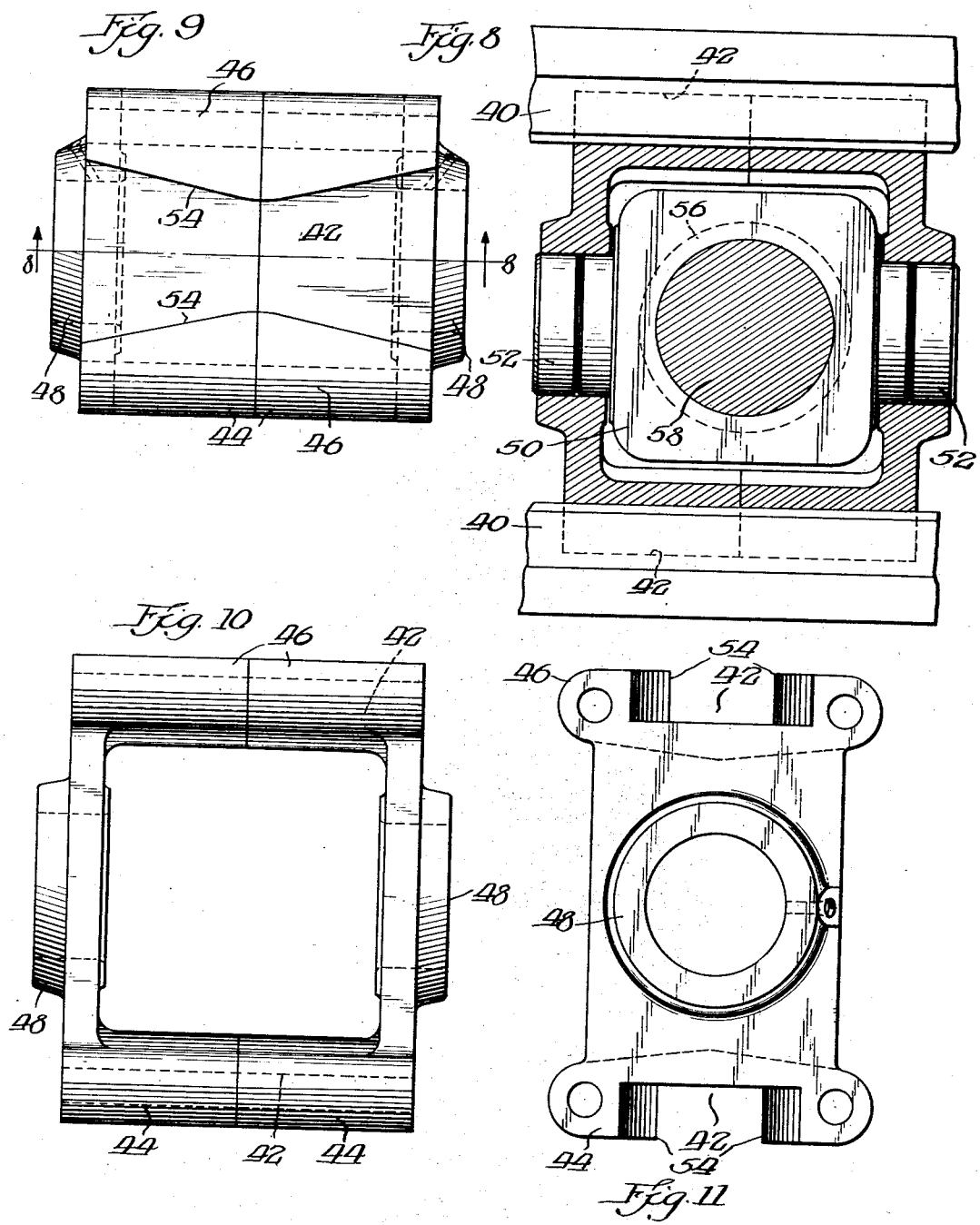

Patented July 18, 1933

1,918,564

UNITED STATES PATENT OFFICE

CLAUDE RORABECK, OF CHICAGO HEIGHTS, ILLINOIS

STEERING CONSTRUCTION FOR TRACTOR UNITS

Application filed May 7, 1931. Serial No. 535,664.

This invention relates to improvements in steering mechanism for the tractor units of power shovels for excavators or heavy machinery.

It is common practice to support a heavy excavator by tractor units at the four corners in order to render the movement of the excavator from place to place relatively more easy. Each of the tractor units generally comprise four supporting wheels engaging a pair of flexible tractor chains formed by inter-connected tractor links which have a flat bearing surface upon the ground.

It is a purpose of the present invention to provide a steering frame which may be readily applied to the standard frame of the tractor unit in order that the tractor unit may be rotated on a vertical axis for the purpose of steering the excavator.

It is further an object of the invention to attach a steering frame to a pair of tractor units at one end of an excavator so that each may be rotated on a vertical axis and to provide connecting mechanism between the pair of steering tractor units so that both may be turned together for the purpose of steering the excavator.

It is further a purpose of the present invention to provide improvements in various details of the steering construction to provide simple mechanism that may be readily operated under all conditions of use.

Further and additional features of the improvements of the present invention will be more readily apparent from the following description taken in connection with the attached drawings, in which—

Figure 3 is a front elevation of the construction shown in Figures 1 and 2;

Figure 4 is a side elevation of the parts which comprise the steering frame;

Figure 5 is a side elevation of the steering arm;

Figure 6 is a detail plan view of the steering nut;

Figure 7 is an end view of the nut shown in Figure 7;

Figure 8 is a vertical section taken through the attachment of the steering arm to the steering nut;

Figure 9 is a top view of the housing parts which are carried by the steering nut;

Figure 10 is a front elevation of the housing parts shown in Figure 9, and

Figure 11 is an end view of one of the housing parts shown in Figures 9 and 10.

Figure 1:
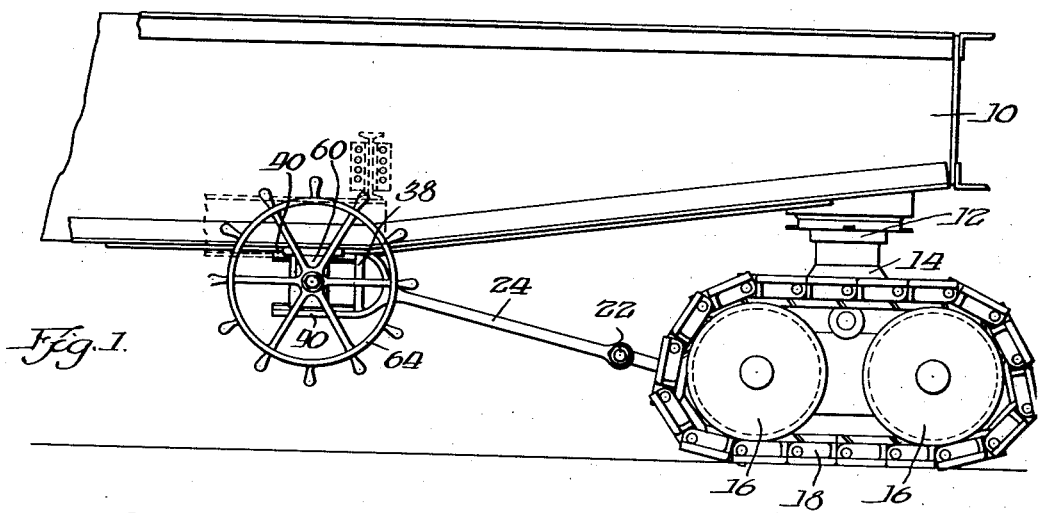
Figure 1 is a side elevation of the front end of an excavator showing one of the steering tractor units.

In the drawings 10 indicates the frame of the excavator or power shovel which is provided at each of its four corners with a bearing 12 for supporting the excavator upon a rotatable frame 14 of a tractor unit which has suitable wheels 16 engaging the endless tractor chains 18. Ordinarily the tractor units are non-rotatable on a vertical axis with respect to the frame of the excavator but according to my invention a mechanism is disclosed for readily converting a tractor unit into a steering unit.

Figure 2:
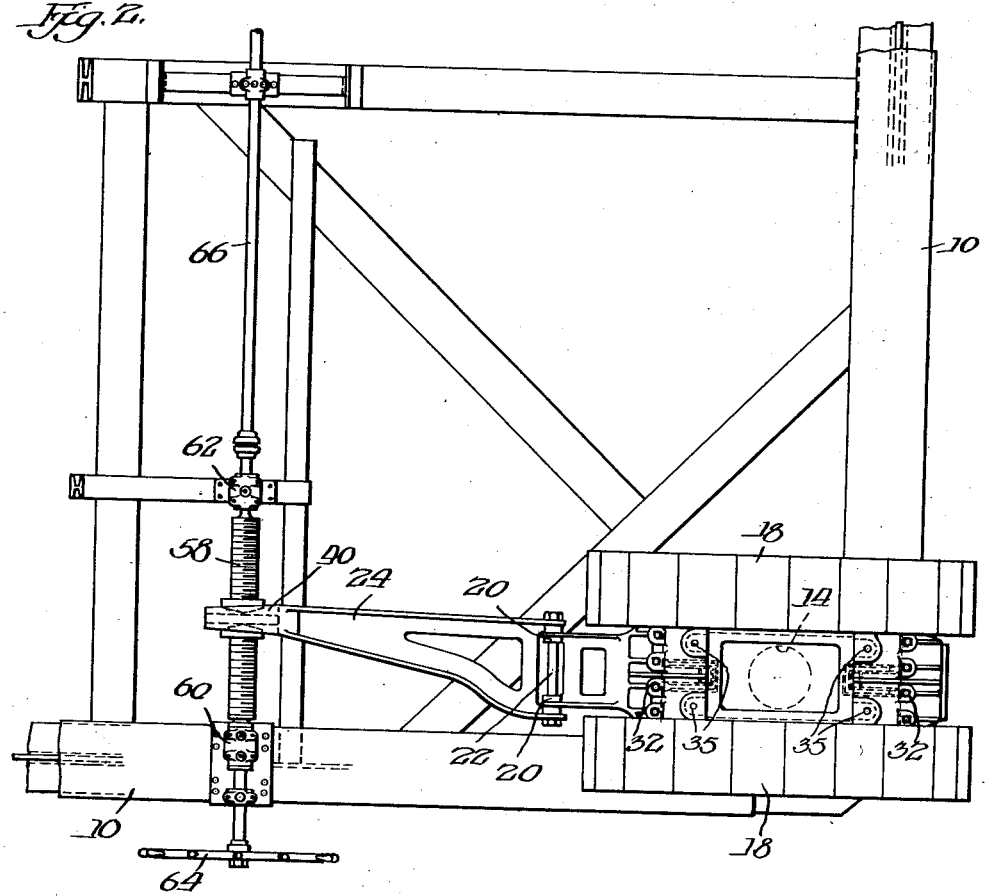
Figure 2 is a plan view of the construction shown in Figure 1.

I show in Figure 4 details of the framing parts which may be attached to the tractor frame in order to permit steering of the unit through a steering arm. Thus I show a lower frame part 19 which has at one end a pair of pintle-receiving bearings 20—20 adapted to be connected by a pintle 22 to a steering arm 24. The pin connection 22 is therefore on a horizontal axis and permits relative movement between the steering arm and tractor unit to allow for the varied heights and movement of the tractor unit. The lower frame part 19 has curved flanges 26 at each end which engage with the frame of the tractor unit and cooperate with the curved flanges 28 formed on a pair of cap members 30, which may be suitably secured to the casting 19 by bolts 32, as shown in Figure 2. The frame parts 19 and 30 may, therefore, be attached to the frame of the tractor unit without weakening the tractor frame by providing additional bolt-receiving openings, since the attaching bolts 32 pass through openings 34 in the part 19 which are aligned with bolt-receiving openings 36 in the cap members 30. The cap members have openings 35 to receive zinc for making a rigid connection.

The steering arm 24, as shown in Figure 5, has a forked end 38. The upper and lower arms of the forked end 30 of the steering arm have parallel ribs 40—40. The ribs 40 of the steering arm fork are adapted to engage in slots 42 formed in a pair of cooperating housing parts 44—44 which are suitably clamped together at a median plane, as indicated in Figures 8, 9 and 10. The parts 44 are provided with longitudinal bolt-receiving openings 46 which may receive clamping bolts. Each of the parts 44 has a bearing 48 to rotatably support the steering worm 50 which has a pair of cylindrical projections 52 adapted to fit into the bearings 48 of the housing parts 44. The side walls of the slots 42 are divergently inclined, as indicated at 54 in Figure 9, from the median clamping plane between the parts towards the ends thereof to accommodate the angularity of the steering arm with respect to the steering worm. The steering worm 50 has an internal spiral thread 56 for engaging the threaded steering shaft 58 supported by bearings 60 and 62 on the frame 10 of the excavator.

The steering shaft may be operated by a steering wheel 64 and, as shown, the shaft 58 may connect to an extension shaft 66 extending across the frame 10 for steering the tractor unit on the other side of the excavator.

The operation will be readily apparent: Turning of the wheel 64 will rotate the steering shaft 58 and cause the worm 50 to travel in an axial direction. The travel of the worm will cause the steering arm 24 to swing and rotate the tractor unit about its vertical axis, due to the universal connection of the steering arm to the steering worm. By reason of the pivotal support of the housing, which slidably engages the steering arm, relative movement of the parts is taken care of. Furthermore, due to the pivotal connection of the steering arm to the steering frame any differences in the relative height between the tractor unit and the steering shaft will not require any change in the parts.

It will be obvious that many changes and modifications may be resorted to without departing from the spirit of my invention as expressed in the appended claims.

I claim:

1. In an excavator, a tractor unit supporting one corner of the frame of the excavator and pivoted on a vertical axis, a steering frame secured to the tractor unit, a steering arm pivotally connected on a horizontal axis to one end of said steering frame, a threaded rotatable steering shaft carried by the frame of said excavator, a steering wheel for turning said steering shaft, a worm mounted to travel axially on said steering shaft, a housing pivotally mounted by said steering worm on an axis transverse to said steering shaft and said steering arm having a fork-shaped end for slidably receiving said housing and permitting angular movement of said steering arm with respect to said steering shaft.

2. In an excavator, a tractor unit supporting one corner of said excavator pivoted on a vertical axis, a steering arm pivotally connected on a horizontal axis with said tractor unit, a steering shaft rotatably supported on said excavator, a steering worm threaded to said steering shaft and adapted to travel axially upon rotation of said steering shaft, a housing pivotally supported by said steering worm on an axis transverse to said steering shaft, said steering arm having a fork-shaped end slidably receiving said housing with provision for permitting angular movement relative thereto.

3. In an excavator, a main frame, a tractor unit frame, a pair of endless tractor chains carried by said tractor unit frame, means connecting the tractor unit frame with the main frame for movement about a substantially vertical axis for steering, a steering frame secured to the tractor unit frame, a steering arm pivoted at its inner end to said steering frame on a substantially horizontal axis, a rotatable steering shaft supported by said main frame with its axis substantially horizontal, a steering worm threaded to said steering shaft and adapted to travel axially of said shaft upon rotation thereof, a housing enclosing said worm and pivoted thereto on an axis transverse to the axis of said steering shaft and a slidable joint between the outer end of said steering arm and said housing, whereby rotation of said steering shaft will turn said tractor unit frame about its substantially vertical axis.

4. In a vehicle, a tractor unit support for said vehicle, a steering frame secured to the tractor unit, a steering arm extending from said steering frame in a direction parallel to the direction of travel of the tractor unit and having its inner end pivoted thereto on a horizontal axis extending substantially transverse to said direction of travel, a rotatable steering shaft carried by the vehicle in an approximately horizontal position, a universal joint connection between the outer end of said steering arm and said steering shaft, and means for imparting lateral movement from said steering shaft to said steering arm upon rotation thereof, said last-named means comprising a threaded portion on the steering shaft and a worm coacting with said threaded portion and carrying said universal joint connection.

CLAUDE RORABECK.